March 18, 1958 S. LUBKIN ET AL 2,827,355

ADJUSTABLE HEADS FOR A MAGNETIC RECORD DRUM

Filed Dec. 30, 1954 3 Sheets-Sheet 1

INVENTORS
SAMUEL LUBKIN
LEON ROBERT MOCK

BY Jesse A. Holton

ATTORNEY

March 18, 1958 S. LUBKIN ET AL 2,827,355

ADJUSTABLE HEADS FOR A MAGNETIC RECORD DRUM

Filed Dec. 30, 1954 3 Sheets-Sheet 2

INVENTORS
SAMUEL LUBKIN
LEON ROBERT MOCK

BY Jesse A. Holton

ATTORNEY

ADJUSTABLE HEADS FOR A MAGNETIC RECORD DRUM

Filed Dec. 30, 1954 3 Sheets-Sheet 3

INVENTORS
SAMUEL LUBKIN
LEON ROBERT MOCK
BY Jesse A. Holton
ATTORNEY

United States Patent Office 2,827,355
Patented Mar. 18, 1958

2,827,355

ADJUSTABLE HEADS FOR A MAGNETIC RECORD DRUM

Samuel Lubkin, Bayside, and Leon Robert Mock, Forest Hills, N. Y., assignors to Underwood Corporation, New York, N. Y., a corporation of Delaware Application December 30, 1954, Serial No. 478,833

15 Claims. (Cl. 346—74)

This invention relates to recording drums having magnetizable surfaces on which information in the form of magnetic variations may be recorded or "written" and from which such information may subsequently be reproduced or "read." More particularly the invention relates to one or a group of magnetic heads for writing or reading information on the surface of such a drum, and to arrangements for adjusting and maintaining proper accurate spacing between the sensitive tips of such heads and the rotating surfaces of drums with which the head tips are to cooperate.

Magnetic record drums, such as those used in electronic computers, are rotated at high speeds. In order to record or reproduce information accurately from these high speed drums, the tips of the writing and reading heads must be spaced very close to the rotating drum surface and be maintained at the same close spacing from the drum under continued operation. A primary object of the present invention is to provide structures and techniques for accurately measuring and adjusting the spacing or gap between a magnetic drum surface and the sensitive tips of a writing or reading head or gang of heads, even though the gap or gaps may be enclosed in a protective housing or otherwise be concealed or made inaccessible.

Another object is to provide a means to preserve the desired adjusted spacing or gap between the drum and a head or heads, regardless of changes in ambient temperature, and preferably to obtain this thermal dimensional stabilization without adding special structures for this purpose alone.

A further object is to provide an improved mechanical linkage and support for adjusting a gang of heads simultaneously with relation to a drum, an arrangement which is simple, easily manufactured, reliable in action, and capable of use with a drum housing which may be sealed against entry of dust.

These objects, and others which will be apparent in the following description, are obtained by providing a single rigid structure in the form of a plate or bar to which a head or a multiplicity of heads may be secured, by mounting this rigid structure adjustably in a housing which may be sealed with respect to the drum housing, and by providing special gap-measuring and adjusting linkage details which are readily accessible or useable from points outside of the drum housing and head housing without breaking the seal between the housings. Ambient temperature compensation is obtained by so dimensioning the parts of the head mounting and the adjustment linkage which have different thermal expansion characteristics, that the net expansion or contraction at the drum-and-head gap will remain for all practical purposes at zero change within the range of temperatures to be encountered during operation of the drum.

Other objects and further details of that which is believed to be novel and included in this invention will be clear from the following description and claims, taken with the accompanying drawings in which are illustrated two examples of adjustable heads and techniques embodying the present invention and incorporating improved head mounting, gap measuring, gap adjusting and thermal correction features as outlined above.

Figure 1:
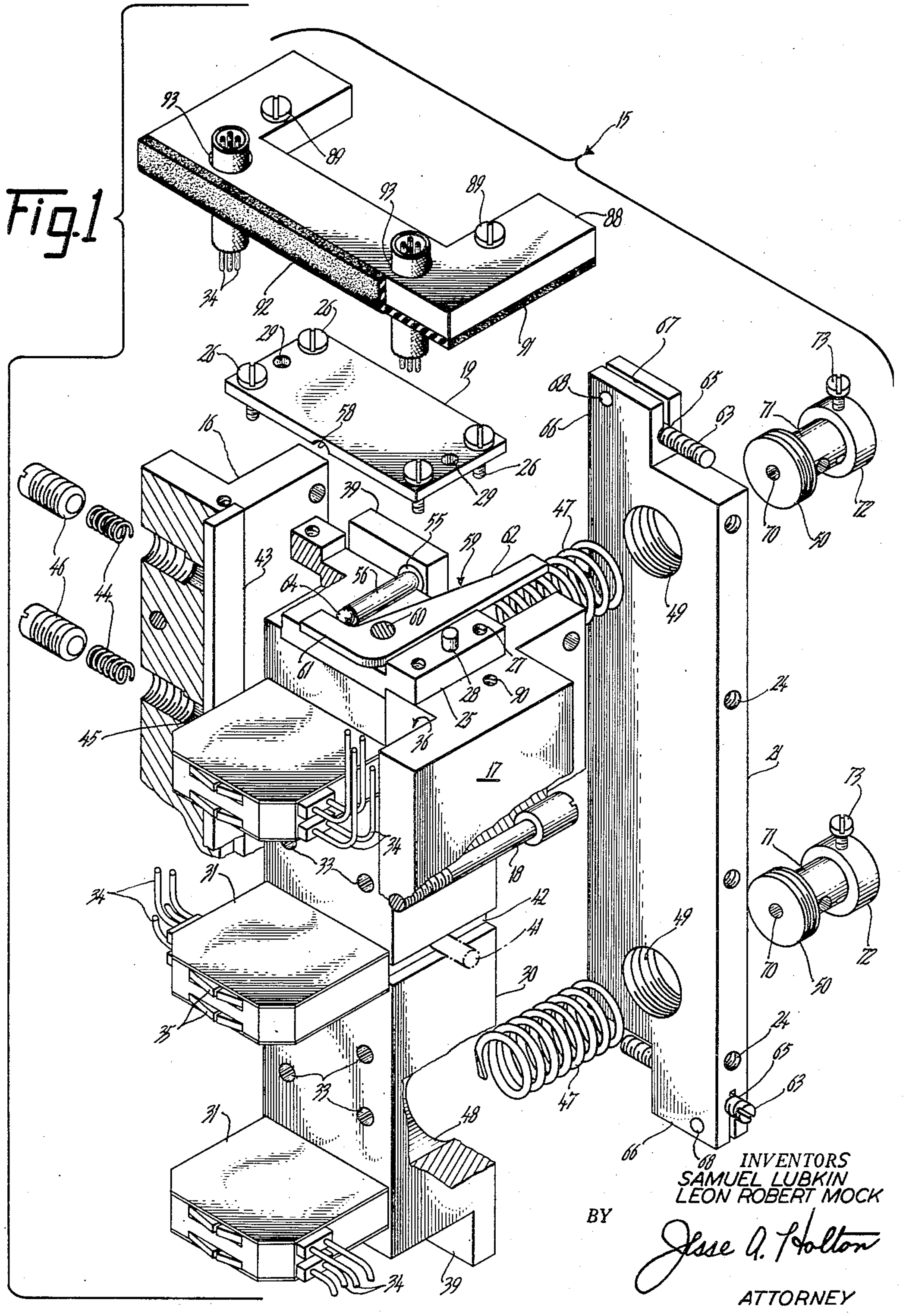
Figure 1 is an exploded perspective view showing the principal elements of a housing for magnetic heads, a multiple head assembly and an adjustment linkage according to one form of the invention, parts being broken away to show internal construction.

A magnetic drum assembly of the type to which this invention is best adapted will include a cylindrical drum proper 10, supported on a rotating drum shaft 11, and coated as at 12 with a substance which will be magnetizable for the purpose of receiving information to be recorder and reproduced. The magnetizable coating is shown as of exaggerated thickness for the purpose of illustration only. The drum shaft and drum are rotated at high speeds by any suitable motor (not shown) and supported in rotation by any desired bearing arrangement (not shown) within a protective stationary drum housing 13. The drum housing will be provided with openings or windows 14 at any desired points about its periphery. Although the single window shown will be used for mounting a ganged head assembly housing 15, other windows may be used as access or observation openings and covered by suitable removable or transparent plates.

In the examples shown, the housings 15 for the magnetic heads are of box-like form, built up from several separate pieces such as the side wall plates 16 and 17, secured as by bolts 18 to the drum housing 13, a top plate 19 and bottom plate 20, and a back plate 21. In the form shown in Figures 3, 4 and 5, the back plate is numbered 22. In both forms the back plate is held between the side plates as by machine screws 23 threaded into suitable tapped holes 24 in the back plate. The top and bottom plates, besides partially closing these ends of the housing, also hold in place supporting blocks 25 for the head adjusting linkage at the top and bottom of the head housing. The top and bottom plates are secured by machine screws 26 which pass through clearance holes 27 in the blocks 25 and are threaded into suitable tapped holes in the ends of the side walls. Dowels 28 on the blocks 25 enter holes 29 in the top and bottom plates for precise alignment of these parts with respect to each other. This head housing spans and closes one of the window openings 14.

Figure 2:
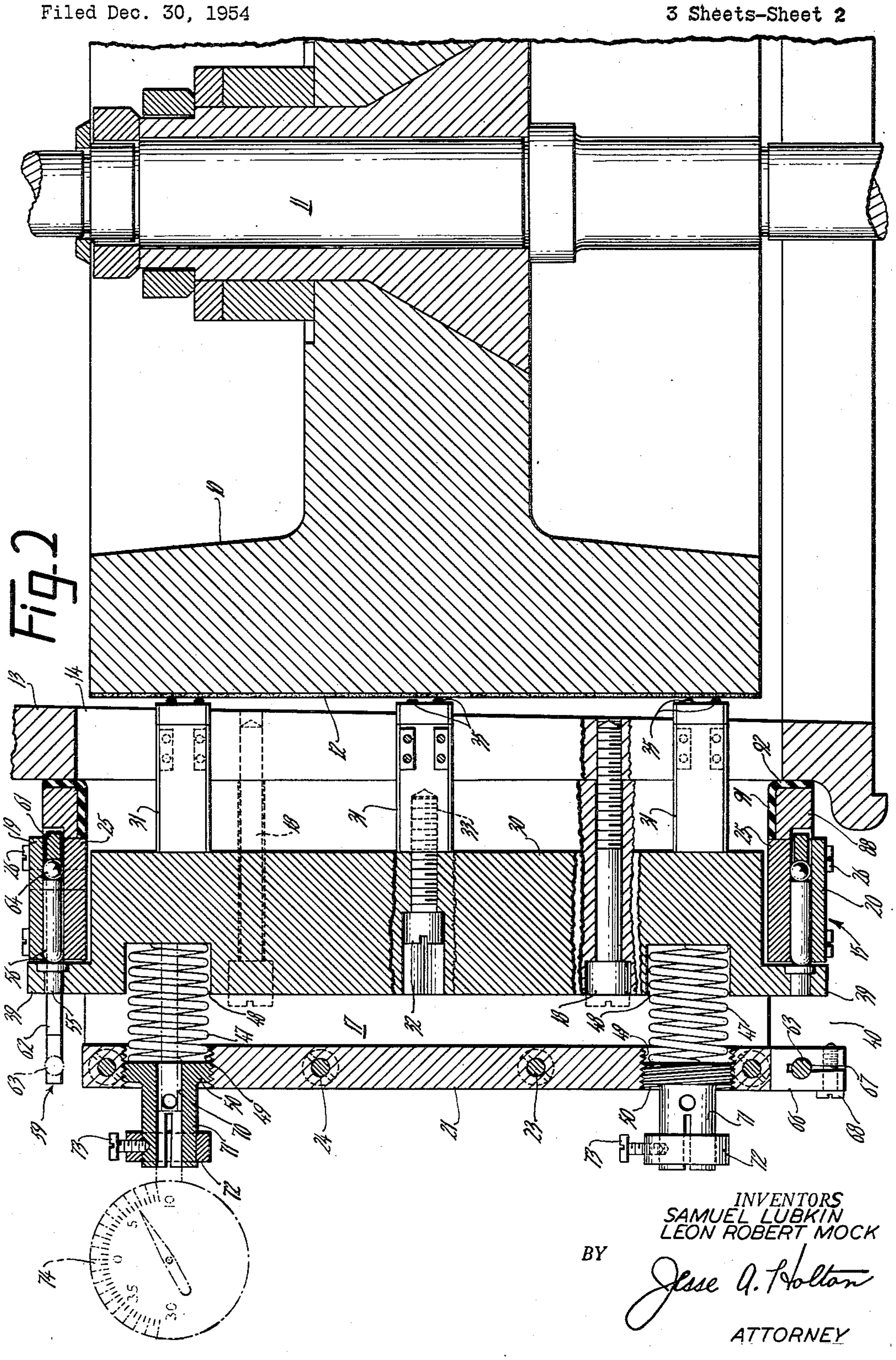
Figure 2 is a sectional side view showing the parts of Figure 1 assembled for use with a magnetic drum and its housing, and indicating in dot-dash lines an instrument used in measuring the drum-head gap.

Within the box-like housing, the multiple head assembly is mounted for support and for adjustment toward or away from the drum. Referring to Figures 1 and 2, on a head-mounting block or platform 30 within the housing a number of magnetic heads or head units 31 are secured in any desired fashion. For this purpose, screws 32 extend through holes 33 in the platform 30 and are threaded into the backs of the head units. The platform 30 constitutes a single rigid member to which all of the heads are secured for simultaneous adjustment.

Electrical leads 34 extend from each head and are connected inside the body of each head unit to the windings for the pairs of magnetic tips 35 on that head. The side walls of the housing, opposite the sides of the head units, are stepped outwardly to form a sort of a channel 36 on each side of the heads, in which channel the leads 34 from the heads may be laid and brought together out of the top or bottom of the housing as later explained.

Figures 3, 4, 5:
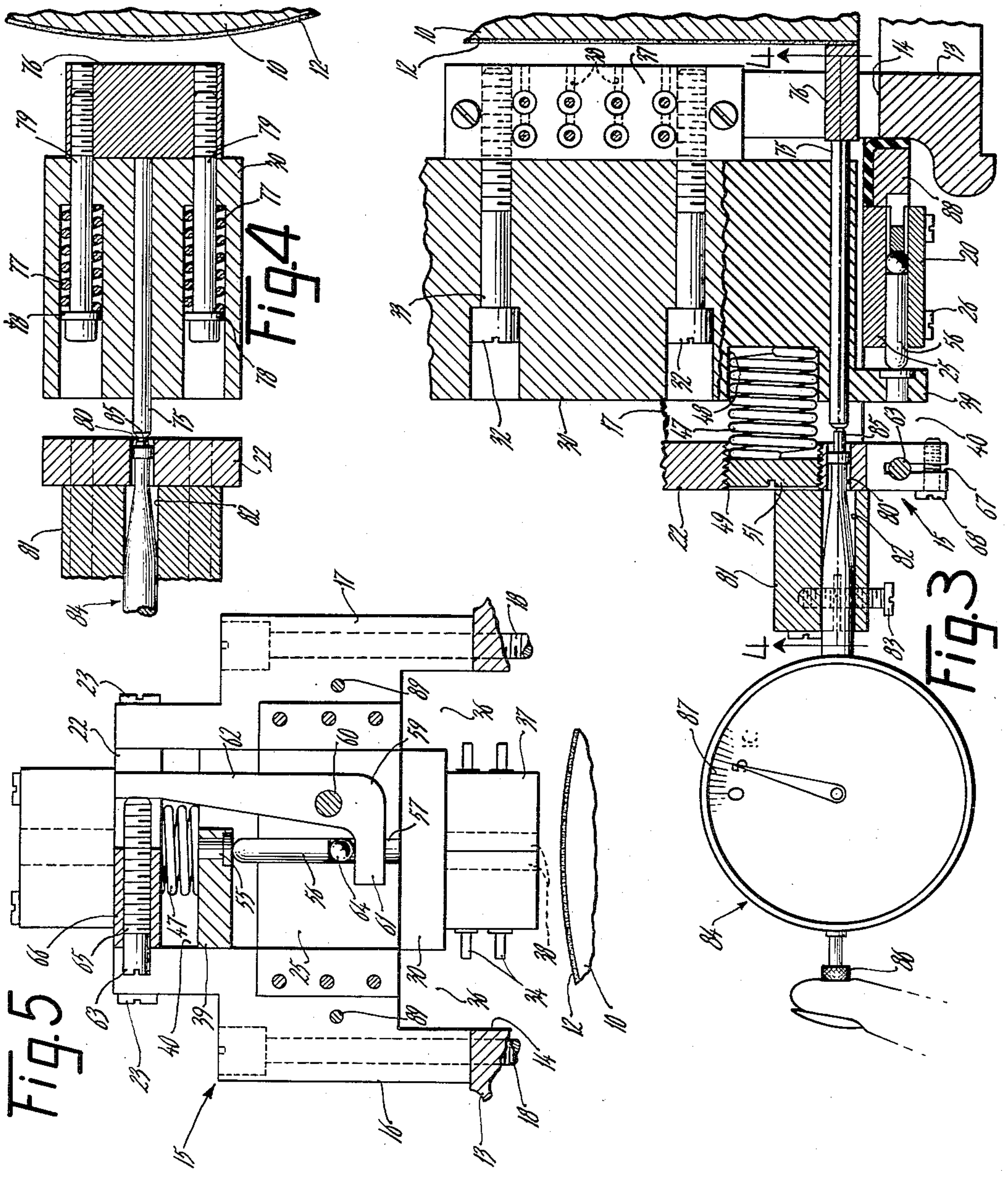
Figure 3 is a fragmentary sectional view similar to Figure 2 but showing a second form of the invention in which a somewhat different arrangement is being used for measuring the drum-head gap.
Figure 4 is a sectional view taken on the line and in the direction of the arrows 4—4 of Figure 3 but with the gap-measuring devices in a different position.
Figure 5 is a top plan view, partly in section, illustrating the head adjustment and thermal compensation linkage, which may be used with either form of the invention.

In Figures 3 and 5 a different type of head 37 is illustrated, where many pairs of tips 38 are mounted in a single head unit and where these tips terminate flush with the face of the unit opposite the drum. Details of such a form of head may be found in patent application Serial No. 494,998, filed March 17, 1955, by Samuel Lubkin and assigned to the same assignee as the present invention. For purposes of the present invention it is immaterial what type or style of magnetic head or head unit is used, as long as the parts, including the head mounting block or platform 30, are manufactured so that all of the tips of the heads in the assembly are located in a single plane, and with the most magnetically sensitive portions of all the pairs of tips located in a single straight line of that plane. This straight line of the sensitive tip portions must be adjusted and supported so that it is parallel to the drum axis and lies a desired close distance from the rotating surface of the drum at all times.

The platform 30 in both forms includes upper and lower flange portions 39 which extend at either end of the housing into recesses or openings 40, located between the back edges of the top and bottom plates, and the front of the back plate 21 or 22. These flanges are used in adjusting the position of the platform, and hence the position of the heads, as will be explained later. The head platform is guided in its movement during adjustment and is supported during use by the walls of the housing. In addition there is provided a dowel 41 fixed in the side wall 17, with a free end which rides in a guiding slot 42 in one side edge of the platform 30. The platform is biased against the wall 17 and its guiding dowel by a pressure plate 43, mounted in a recess in the opposite side wall 16, this plate being pressed by springs 44 which are held in spring guiding holes 45 by screw plugs 46. This construction gives both vertical and horizontal support and guiding to the head assembly.

In adjustment of the head assembly, it is preferred that the heads be biased at all times toward the drum, and that adjustment be obtained by a linkage which limits the extent of movement permitted toward the drum. The bias springs 47 are therefore provided, and these extend between the bottoms of sockets 48 in the platform 30, and threaded sockets 49 in the back plate 21 or 22. Screw plugs 50 in Figures 1 and 2 and plugs 51 in Figure 3 hold the bias springs in place after assembly.

The bias springs move the head assembly toward the drum until the flanges 39 on the platform strike against the adjustable linkage as noted above. The linkage at the top of the housing only will be described, because this linkage is duplicated at the bottom next to the bottom flange 39. In the flange 39 a shouldered bearing bushing 55 of hard material, such as steel, is provided so that the comparatively softer aluminum of the platform will not become distorted or compressed during adjustment or use. Bearing against this bushing is a hardened steel adjustment plunger 56, having a rounded end where it meets the bushing. The plunger is supported and guided in its endwise movement by a groove 57 in supporting block 25 and by a corresponding groove 58 in top plate 19. The longitudinal position of the plunger 56 in its guiding grooves, and therefore the position of the head assembly, is governed by movement of a bell-crank lever 59, which is pivoted as at 60 to the supporting block 25, has a short arm 61 with a free end extending opposite the end of the plunger, and has a long arm 62 extending generally alongside the plunger, with an end opposite an adjusting screw 63. A bearing ball 64 is interposed between the short arm 61 and the end of plunger 56, and the ball rides in the guiding grooves with the plunger. A good ratio between the effective arm lengths has been found to be 6 to 1.

It will be seen that adjustment may be obtained simply by turning the adjusting screw in or out of the threaded hole 65 in the extension 66 of back plate 21 or 22. The hole 65 is split longitudinally as at 67 so that a locking screw 68, spanning the split, may be used to tighten and hold the adjusting screw 63 in any of its adjusted positions. When the adjusting screw 63 is turned inwardly, it rocks the lever 59 about its pivot 60, and the short arm 61 will push the plunger 56 against the bushing 55 to move the head assembly away from the drum against the bias of the springs 47. When the screw 63 is backed off, the springs 47 will be permitted to force the linkage in the opposite direction and move the head assembly toward the drum.

Note that the plungers 56 at top and bottom are located and move in a common vertical plane, a plane which when extended would pass through the axis of the drum. The straight line common to all the tips of the magnetic heads also lies in that plane, which may be called the plane of adjustment or movement of the heads. Obviously, when adjusting the heads for proper spacing from the drum, the best practice is to adjust each end alternately by small increments so as to maintain general parallelism of the head assembly with its vertical cylindrical face of the drum.

Although the head adjusting arrangement is the same in both forms of the invention illustrated here, the structures and methods used for measuring the distance between the drum surface and the tips of the heads differ in the two forms shown. The form of Figures 1 and 2 will first be considered. As described above, the screw plugs 50 hold the head platform pressure springs 47 in place. These plugs may also be used to mount dial indicators or similar instruments used in measuring the drum-head gap. For this purpose the plugs 50 are each provided with a central bore 70 and a split cylindrical extension 71. Surrounding the extension is a ring 72 carrying a set screw 73. When the stem of a dial indicator 74 is inserted in the bore as shown in Figure 2, it may be clamped in place by tightening the screw 73, thereby drawing the split walls of the extended portion of the plug toward each other. Other arrangements could be used for this if desired.

In measuring and adjusting by the mechanisms shown in Figure 1, an indicator 74 is inserted into each of the plugs 50 with the tip of the indicator resting against the bottom of the recess 48 in the head platform. The adjusting screws 63 are backed out at both ends to permit the springs 47 to move the platform 30 inwardly toward the drum until all the heads 31 have their tips 35 just touching the drum surface 12. This presupposes that the tips are previously arranged so as to lie in a single straight line and plane as above described. In practice it has been found useful to rotate the drum by hand until the touching of the drum by the tips is "felt" as a gentle drag by the person adjusting.

The instruments are firmly clamped in the plugs and the pointers on both indicators are now set at a convenient reference point, preferably "zero." This indicates no spacing or gap between the heads and the drum.

The adjusting screws 63 are then run in, thereby retracting the platform 30 against the pressure of the springs and carrying the head tips 35 away from the drum. Adjustment is kept as equal as possible at both ends until the optimum or desired theoretical gap is indicated at both ends by equal movement of the dial indicator pointers away from the starting reference points. In an assembly made according to this invention, a gap of from 1 to 2 mils gave best results. Outside of this range undesirable effects were found likely to occur in use of the apparatus.

Finally the adjusting screws 63 are locked by tightening the set screws 68 and the positions on the indicator dials are rechecked. If unchanged, the indicators may be removed and the adjustment regarded as complete. However, if desired, an electrical check or test of the equipment may be made before or after the indicators are removed, and further corrections in the adjustment may be made until the check or test is satisfactory.

An alternate structure and method for measuring the gap is used in the form shown in Figures 3, 4 and 5. In this form the screw plugs 51 are nothing more than a means for holding the springs 47 in place. Measuring of the gap is accomplished by plungers 75 carrying "feeler" blocks 76. Each end of the head mounting block or platform 30 is provided with similar structure so that a description of one end will suffice. The plunger with its block is slidably mounted in the platform for horizontal movement toward and away from the drum. It is normally retracted away from the drum as by springs 77 which press against shoulders 78 on guiding pins 79, which are secured to the feeler block. The plunger 75 also passes through a hole in the platform 30 from the feeler block 76 and extends to a point in or near a gauging hole 80 in the back plate 22 of the housing.

Outside of each of the holes 80, an instrument clamping block 81 is bolted or otherwise secured to the back plate. This block has a bore 82 registering with the hole 80, and it may be split like the extensions 71 of plugs 50 so that a set screw 83 can be tightened to clamp the stem of an indicator 84 therein. The instrument 84 is of a type wherein a probing end 85 is normally retracted as seen in Figure 4, but may be extended as shown in Figure 3 by pressing inwardly on a finger piece 86 on the side of the instrument opposite the indicating dial 87.

Measuring and adjustment here is based on the fact that the blocks 76 are made so that their outer faces normally extend precisely in the same plane and line as the faces or tips of the magnetic heads 37. This "normalizing" may be done by simultaneously machining the tips of the heads and the outer surfaces of the feeler blocks to a common plane after assembly of the units and blocks on the head mounting platform 30. Obviously, thereafter, if a plunger is pushed inwardly for a given distance, the outer face of its connected feeler block will be moved an equal distance, and this distance will be exactly equal to the difference in level between the feeler block which was moved and the original common plane of the magnetic head tips.

In this form it will be noted that the feeler blocks are located outside of the record area on the drum, i. e., outside of the area where information will be recorded on or read from the drum, although the blocks are opposite parts of the drum which are coated with magnetizable material. In this form, the indicators 84 are installed and clamped in place in the bores 82 of the clamping blocks 81, and the heads are adjusted as before described until they are roughly somewhere near the drum. The end 85 of the indicator must be resting against the end of plunger 75. Then as the finger piece 86 on one indicator is pushed inwardly, the plunger 75 is moved until the block 76 strikes the surface 12 on the drum 10 and is stopped. The extent of movement of the feeler block is then noted from the dial 87, this being a measure of the gap. The operation is repeated for the other end of the head assembly, and further appropriate adjustment is made, first at one end and then at the other.

From experience, and by repeated checks on the indicators, both ends of the head mounting platform 30 are adjusted inwardly or outwardly until the desired spacing between the drum and the heads is indicated. The screws 68 are tightened to lock the adjusting screws 63 in position, necessary checks are made, and the indicators 84 may then be removed. An advantage of this form of the invention is the fact that at any time after original adjustment the spacing or gap may be checked, merely by inserting an indicator and depressing the plunger. In this way, maintenance inspection may be made easily, without disturbing the adjustment of the heads unless it is required.

From the description above it will be noted that the leads 34 from the magnetic heads may be laid in channels 36 on either side of the heads. For eliminating "cross-talk" between adjacent head units, and for other purposes it is often preferred that the leads for one head be brought out on one side and the leads on the immediately adjacent heads be brought out on the opposite side. This has the additional advantage that the number of leads laid in each channel may be kept approximately equal, and the number of leads in a bunch may therefore be kept to a small number. By bringing some leads out of the bottom of the housing and other leads out of the top of the housing further spread in distribution of the leads may be made.

In order to close the ends of the channels 36, and to complete a dust-tight sealing of the top and bottom of the head housing with the drum housing, identical top and bottom dust seals 88 are provided, held in place by screws 89, threaded into appropriate holes 90 in the ends of the side walls 16 and 17. A rubber gasket 91, having the same general U-shape as each dust seal, but with an added lip 92 for bearing against the drum housing, completely closes the joints at top and bottom of the housing assembly. Apertures 93 in the dust seals and gaskets provide passageways from the channels 36 so that leads may be brought out of either channel at the top or the bottom for connection to the reading or writing equipment.

With a little thought it will be realized that where two elements are mounted on a metallic structure at a precise distance one from the other, changes in temperature of the metallic structure will result in expansion or contraction of the metal and consequent variation of the distance between the elements. For this reason it is desirable to include in the head mounting some means to compensate for temperature variations, so that the minute gap between the drums surface and the magnetic tips on the heads will remain for all practical purposes constant, within the range of temperatures encountered in operation of the apparatus. The drum, the drum housing, the box-like head housing and the head mounting block or platform are all made of aluminum, with a coefficient of expansion of $22\times10^{-6}$. The bodies or casings of the magnetic heads may be made of aluminum, or may be brass, with a $19\times10^{-6}$ coefficient of expansion. Because it is possible that apparatus of the type described may be used in temperatures ranging between —50° and +100° centigrade, it will be seen that a desired gap adjustment of the order of 1 to 2 mils will not be maintained unless special provision is made. This could be accomplished by building and installing a special temperature—compensating element in the adjustment linkage which would cancel out the expansion or contraction effect at the gap. However, it is preferred to gain the temperature compensation effect by proper design of the adjustment linkage itself, and by the selection of materials for the linkage which will result in the maintenance of a constant gap.

It will be noted that the principal elements of the adjustment linkage whose expansion and contraction might have an effect on the gap are the adjustment plunger 56 and the ball 64. These are purposely positioned in lines perpendicular or radial to the drum surface, extend inwardly from the head platform toward the drum, and are made of steel, having a coefficient of expansion of only $10\times10^{-6}$. The length and material of the plunger 56 and ball 64, and the direction and position of their extent, effectively compensate for or cancel out, most of the expansion or contraction which might otherwise take place at the drum and head gap. The rest of the adjustment linkage including the bell crank lever 59, the adjusting screw 63 and the bearing bushing 55, is for convenience also made of steel. These parts may be so designed and positioned that their expansion and contraction either have no effect or may introduce any minute final corrective factors necessary in reaching a practical constant adjustment of the gap at all temperatures.

The material of the magnetic tips in the heads of the presently disclosed designs may be ignored in expansion calculations, since this ferro-magnetic ceramic material has an expansion coefficient of only 6 to $9\times10^{-6}$, and the dimensions of the tips in the direction of possible gap variation is small compared to the dimensions of the other parts. However, with some designs of heads, this material and its dimensions should be considered in calculating the desired thermal correction to be built into the adjustment linkage.

As will be evident from the foregoing description, certain aspects of this invention are not limited to the particular details set forth as an example, and it is contemplated that various and other modifications and applications of the invention will occur to those skilled in the art. It is therefore intended that the appended claims shall cover such modifications and applications as do not depart from the true spirit and scope of the invention.

What is claimed as new and desired to be secured by Letters Patent of the United States is:

1. Recording equipment including a rotating magnetic record drum, a stationary housing enclosing said drum, said housing having a window in the periphery thereof, a head housing closing said window, a magnetic head movably supported within said head housing for cooperation with said drum, a mechanism connected to said head within the housing and moving said head between positions of adjustment optionally toward and away from said drum, a manual control connected to the adjustment mechanism but located and accessible entirely outside of said housings, and thermally repsonsive means including said adjustment mechanism said means automatically maintaining a given adjustment position of said head under differing ambient temperature conditions.

2. Magnetic recording equipment comprising a rotating cylindrical drum, a magnetizable record surface on said drum, a housing enclosing said drum, said housing having a window opening in its periphery, a head housing spanning and closing said window opening and extending outside of the drum housing, a single rigid head mounting platform movably supported in said head housing, a plurality of magnetic heads carried by said platform, magnetic tips on said heads for cooperation with said record surface on said drum, a mechanical linkage within the head housing connected between portions on said housing and portions on said platform, said linkage moving said platform for simultaneous adjustment of said heads optionally toward and away from the record surface on said drum, and a manually operable adjusting element connected to and controlling the position of said mechanical linkage, said element being located at least in part outside of said housings and accessible for entire control of the adjustment from outside said housings.

3. In magnetic recording equipment having a rotating cylindrical drum, a magnetizable record surface on said drum, a housing enclosing said drum, said housing having a window opening in its periphery, and a head housing spanning and closing said window opening and extending outside of the drum housing, that improvement comprising a single rigid head mounting member movably supported in said head housing, a plurality of magnetic heads carried by a side of said mounting member next to said drum record surface, magnetic tips on said heads for cooperation with said record surface, a mechanical linkage within the head housing connected between portions on said housing and portions on said mounting member, said linkage moving said mounting member for simultaneous adjustment of the head tips optionally toward and away from the record surface on said drum, an adjusting element connected to and controlling the position of said mechanical linkage, said element being located at least in part outside of said housings and accessible for entire control of the adjustment from outside said housings, and said head housing having an opening therein giving access to a portion of said mounting member, said opening adapted removably to receive a measuring instrument therein for application to said mounting member, whereby the position of said head tips may be determined by the instrument from outside the housings.

4. Magnetic recording equipment comprising a rotating cylindrical drum, a magnetizable record surface on said drum, a housing enclosing said drum, said housing having a window opening in its periphery, a head housing spanning and closing said window opening and extending outside of the drum housing, a single rigid head mounting platform supported in said head housing for movement toward and away from said drum, a plurality of aligned magnetic heads carried by said platform and movable therewith in a plane of movement passing through the axis of said drum for cooperation with said record surface on said drum, a mechanical linkage within the head housing, extending between portions on said housing and portions on said head mounting member, said linkage including a bell crank lever pivoted in said head housing, a plunger slidably mounted in said housing and extending from one arm of said bell crank to said platform in said plane of head movement, and an adjusting screw connected to the other arm of said bell crank and controlling the position of the mechanical linkage and the aligned heads, said screw extending at least in part outside of said housings where it is accessible for control of the adjustment.

5. Recording equipment comprising a rotating magnetic record drum, a stationary housing enclosing said drum, said drum housing having a window in the periphery thereof, a head housing closing said window, a magnetic head supported within said head housing for movement toward and away from said drum, a spring biasing said head toward said drum, an adjustment linkage limiting the movement of said head in the direction of said drum, said linkage including a bell crank lever pivoted in said head housing, an adjusting screw bearing against one arm of said bell crank, and a plunger slidably mounted in said head housing and extending from the other arm of said bell crank to said head, opposing said spring bias.

6. Magnetic recording and reproducing equipment comprising a moving magnetic record surface, a normally stationary platform supported adjacent said surface and adjustable toward and away from said surface in a plane of adjustment normal thereto, magnetic heads on said platform, a row of magnetically sensitive tips on said heads in the said plane of adjustment, adjustment linkage for said platform including an elongated slidable plunger near an end of said platform in said plane of adjustment and extending and slidable lengthwise in said plane, an adjusting element, one end of said plunger engaging said platform, the other end of said plunger extending into engagement with said adjusting element for controlling the position of said plunger, and hence the position of said row of head tips.

7. Magnetic recording and reproducing equipment comprising a moving magnetic record surface, a normally stationary rigid platform supported adjacent said surface and adjustable toward and away from said moving surface in a plane of adjustment normal thereto, magnetic heads on said platform, a row of magnetically sensitive tips on said heads in the said plane of adjustment, adjustment linkage for said platform including a pair of elongated slidable plungers, one near each end of said row of tips in said plane of adjustment and extending and slidable lengthwise in said plane, a pair of adjusting elements, one end of each plunger engaging said platform, the other end of each plunger extending toward said record surface into engagement with an adjusting element for controlling the position of said plunger, and means biasing said platform into engagement with said plungers and each plunger into engagement with its adjusting element.

8. In magnetic record equipment having a magnetizable record surface moving in a fixed path, a normally stationary platform adjacent said path, magnetic heads carried by said platform for magnetic cooperation with said surface, and a housing enclosing said surface, platform and heads, an improved adjustment mechanism for moving said platform and heads simultaneously toward an optimum position of cooperation between said heads and said surface, said adjustment mechanism comprising an elongated plunger slidably mounted to move lengthwise in a direction normal to said record surface with one end engaging said platform, a pivoted bell crank lever with a short arm engaging at its free end the other end of said plunger and a long arm extending generally alongside said plunger, and an adjusting screw bearing against the free end of said long bell crank arm.

9. In magnetic record equipment having a magnetizable record surface moving in a fixed path, a normally stationary platform adjacent said path, magnetic heads carried by said platform for magnetic cooperation with said surface, and a housing enclosing said surface, platform and heads, an adjustment mechanism moving said platform and heads simultaneously toward an optimum position of cooperation between said heads and said surface with said heads spaced from said surface, a passageway in said housing communicating with said platform, and a clamp on said housing next to said passageway adapted to secure a measuring instrument removably therein for application to said platform, whereby the spacing as adjusted between said heads and said record surface may be measured from outside said housing.

10. In magnetic record equipment having a magnetizable record surface moving in a fixed path, a normally stationary platform adjacent said path, magnetic heads carried by said platform for magnetic cooperation with said surface, and a housing enclosing said surface, platform and heads, an adjustment linkage between said housing and said platform for moving said platform and heads together toward an optimum position of cooperation between said heads and said surface with said heads spaced from said surface, the materials of said housing having a first thermal coefficient of expansion, and the materials of said adjustment linkage having a second and lower coefficient of expansion, whereby under various ambient temperature expansion and contraction of the parts will result in a practical fixed spacing between said heads and said record surface.

11. In magnetic record equipment having a magnetizable record surface moving in a fixed path, a normally stationary platform adjacent said path, magnetic heads carried in a common plane by said platform for magnetic cooperation with said surface, and a housing enclosing said surface, platform and heads, an adjustment mechanism moving said platform and heads together toward an optimum position of cooperation between said heads and said surface with said heads spaced from said surface, and means for measuring the spacing between said heads and said record surface, comprising a plunger slidably mounted in said platform, a feeler block on one end of said plunger adjacent said heads, a spring retracting said plunger and block against said platform with a face on said block in the same common plane with the magnetic heads, and said housing having an aperture therein opposite the other end of said plunger, whereby the plunger may be moved from outside the housing against the spring retraction until the feeler block touches the record surface, and the movement of the plunger will indicate the spacing between the common plane of the heads and the path of the record surface.

12. In record equipment of the type having a magnetizable record surface moving in a fixed path, a housing, and magnetic recording and sensing heads supported within the housing for magnetic cooperation with said record surface at an adjusted desired spacing from said surface, a mechanism for adjusting and maintaining constant said desired spacing between said heads and said record surface under varying ambient temperature conditions, comprising an adjusting screw in said housing, a plunger slidably extending in said housing from said heads with one end directed toward said record surface, a bell crank lever pivoted on said housing, one arm of said bell crank engaging the record surface directed end of said plunger, and the other arm of said bell crank engaging said adjusting screw, said housing being made of material having an effective first coefficient of thermal expansion and said plunger being made of a material having a second and lower coefficient of expansion than said housing.

13. Record equipment comprising a cylindrical drum rotatable about a central axis, a record surface on said drum, a stationary housing around the drum having a window opening therein, a box-like head housing closing and spanning the window opening and with an open side next to the window opening, a head mounting block supported and guided in the head housing for adjustable movement toward and away from the open side of said housing in a plane of adjustment passing through the drum axis, a row of heads mounted on said block, tips on said heads located in a single straight line in said plane of adjustment for cooperation in adjusted spaced relation with the drum record surface in recording and reproducing information on said surface, said drum, drum housing, head housing, and mounting block being composed of aluminum, a pair of elongated adjustment plungers composed of steel each slidably mounted in the head housing to move and extend longitudinally in said plane of adjustment toward and away from the drum axis, the outer end of each plunger engaging and bearing against the head mounting block, the inner end extending toward the drum axis, adjusting means carried by said head housing engaging and bearing against the inner ends of said plungers, and spring means between said head housing and said head mounting block biasing said block into engagement with said plungers and said plungers into engagement with said adjusting means, the differences in expansion and contraction in said plane of adjustment between said aluminum and said steel parts maintaining the adjusted spacing between the head tips and the record surface practically constant under varying temperature conditions.

14. Record equipment comprising a cylindrical drum rotatable about a central axis, a magnetizable record surface on said drum, a stationary housing around the drum having a window opening therein, a head housing closing the window opening and with an open side next to the window opening, a head mounting block supported and guided in the head housing for adjustable movement toward and away from the open side of said housing, a row of heads mounted on said block, magnetic tips on said heads facing said record surface for magnetic recording and reproducing cooperation therebetween, means for simultaneously adjusting the positions of all the tips with respect to the record surface including a pair of elongated plungers each slidably mounted in the head housing to move and extend longitudinally toward and away from the drum axis, the outer end of each plunger engaging the head mounting block, the inner end extending from the block toward the drum axis, adjusting means carried by the head housing engaging the inner ends of said plungers, means biasing said block, plunger and adjustment means into their engagements with each other, means including said plungers maintaining a given adjustment position of said magnetic tips with respect to said record surface under differing temperature conditions, and means for determining the position of said heads from outside said head housing, said means including passageways through said housing communicating with portions of said head mounting block and adapted to receive measuring instruments therein for application to said block.

15. In magnetic record equipment having a magnetizable record surface moving in a fixed path, a normally stationary platform adjacent said path, magnetic heads carried in a common plane by said platform for magnetic cooperation with said surface, and a housing enclosing said surface, platform and heads, an adjustment mechanism moving said platform and heads together toward an optimum position of cooperation between said heads and said surface with said heads spaced from said surface, and means for measuring the spacing between said heads and said record surface, comprising a feeler block movably mounted on said platform, biasing means normally holding said block against said platform with a face of said block in the common plane of said magnetic heads, said block being movable against said bias away from normal position toward and against said record surface, said housing having an aperture therein leading to the feeler block, whereby the block may be moved from outside the housing against the record surface, and its movement will indicate the spacing between the common plane of the heads and the record surface.

References Cited in the file of this patent

UNITED STATES PATENTS 2,708,693 Hendrickson ---------- May 17, 1955